(12) United States Patent
Rotem et al.

(10) Patent No.: US 8,707,060 B2
(45) Date of Patent: Apr. 22, 2014

(54) DETERMINISTIC MANAGEMENT OF DYNAMIC THERMAL RESPONSE OF PROCESSORS

(75) Inventors: Efraim Rotem, Haifa (IL); Doron Rajwan, Rishon Le-Zion (IL); Lev Finkelstein, Netanya (IL)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 12/263,431

(22) Filed: Oct. 31, 2008

(65) Prior Publication Data

US 2010/0115293 A1 May 6, 2010

(51) Int. Cl.
*G06F 1/00* (2006.01)
(52) U.S. Cl.
USPC .......................................................... 713/300
(58) Field of Classification Search
None
See application file for complete search history.

(56) References Cited

U.S. PATENT DOCUMENTS

| | | | |
|---|---|---|---|
| 5,388,265 A * | 2/1995 | Volk | 713/322 |
| 6,232,820 B1 | 5/2001 | Long et al. | |
| 6,697,658 B2 * | 2/2004 | Al-Ali | 600/323 |
| 6,791,157 B1 | 9/2004 | Casto et al. | |
| 6,920,571 B2 | 7/2005 | Shaver et al. | |
| 6,944,783 B2 | 9/2005 | Yu et al. | |
| 6,946,540 B2 * | 9/2005 | Vidaurri et al. | 528/244 |
| 7,073,082 B2 | 7/2006 | Hsu | |
| 7,152,169 B2 | 12/2006 | Cooper et al. | |
| 7,302,595 B2 | 11/2007 | De Cesare et al. | |
| 7,386,737 B2 | 6/2008 | Finkelstein et al. | |
| 7,402,958 B2 | 7/2008 | Nguyen | |
| 7,463,993 B2 | 12/2008 | Finkelstein et al. | |
| 7,679,340 B2 | 3/2010 | Ravichandran et al. | |
| 7,685,445 B2 | 3/2010 | Arabi et al. | |
| 7,698,575 B2 | 4/2010 | Samson | |
| 8,037,445 B2 | 10/2011 | Poirier et al. | |
| 8,069,355 B2 * | 11/2011 | Simeral et al. | 713/300 |
| 8,402,290 B2 | 3/2013 | Finkelstein et al. | |
| 2004/0117673 A1 | 6/2004 | Arabi et al. | |
| 2005/0040810 A1 | 2/2005 | Poirier et al. | |
| 2005/0060594 A1 | 3/2005 | Barr et al. | |
| 2005/0117050 A1 * | 6/2005 | Jiang | 348/372 |
| 2006/0282692 A1 | 12/2006 | Oh | |
| 2007/0061603 A1 | 3/2007 | Cox et al. | |
| 2007/0083779 A1 | 4/2007 | Misaka et al. | |
| 2007/0245161 A1 * | 10/2007 | Shaw et al. | 713/300 |

(Continued)

FOREIGN PATENT DOCUMENTS

CN 1877492 A 12/2006
CN 101030095 A 9/2007

(Continued)

OTHER PUBLICATIONS

Gunther, et al, "Managing the Impact of Increasing Microprocessor Power Consumption", Intel Technology, Journal Q1, 2001, pp. 1-9.

(Continued)

*Primary Examiner* — Mohammed Rehman
(74) *Attorney, Agent, or Firm* — Caven & Aghevli LLC (57) ABSTRACT

Methods and apparatus relating to deterministic management of dynamic thermal response of processors are described. In one embodiment, available thermal headroom may be used to extract the performance potential in a deterministic way, e.g., such that it reduces or even eliminates the product-to-product variations. Other embodiments are also disclosed and claimed.

32 Claims, 5 Drawing Sheets

(56) References Cited

U.S. PATENT DOCUMENTS

| | | | |
|---|---|---|---|
| 2007/0257650 | A1 | 11/2007 | Southwell et al. |
| 2007/0280079 | A1* | 12/2007 | Cheng et al. ............... 369/59.1 |
| 2007/0283178 | A1 | 12/2007 | Dodeja et al. |
| 2008/0001634 | A1 | 1/2008 | Arabi et al. |
| 2008/0005592 | A1* | 1/2008 | Allarey et al. ............... 713/300 |
| 2008/0022140 | A1 | 1/2008 | Yamada et al. |
| 2008/0082844 | A1* | 4/2008 | Ghiasi et al. ............... 713/323 |
| 2008/0140338 | A1 | 6/2008 | No et al. |
| 2008/0168287 | A1 | 7/2008 | Berry et al. |
| 2008/0219328 | A1* | 9/2008 | Sanada et al. ............... 375/148 |
| 2008/0301475 | A1* | 12/2008 | Felter et al. ............... 713/300 |
| 2008/0317086 | A1 | 12/2008 | Santos et al. |
| 2009/0089602 | A1* | 4/2009 | Bose et al. ............... 713/340 |
| 2009/0327776 | A1 | 12/2009 | Nguyen |
| 2010/0115304 | A1 | 5/2010 | Finkelstein et al. |
| 2010/0191997 | A1 | 7/2010 | Dodeja et al. |
| 2013/0219196 | A1 | 8/2013 | Finkelstein et al. |

FOREIGN PATENT DOCUMENTS

| | | |
|---|---|---|
| CN | 101923383 A | 12/2010 |
| DE | 10 2009 051 387 A1 | 9/2010 |
| TW | 594465 B | 6/2004 |
| TW | 594466 B | 6/2004 |
| TW | I240206 B | 9/2005 |
| TW | I298437 B | 7/2008 |
| TW | 201022923 A1 | 6/2010 |
| WO | 2005/098579 A2 | 10/2005 |

OTHER PUBLICATIONS

Office Action Received for U.S. Appl. No. 12/165,231, mailed on Mar. 29, 2011, 10 pages.

Intel, "Power Management in Intel Architecture Servers", White Paper, Apr. 2009, pp. 1-11.

Intel, "Intel 64 and IA-32 Architectures Software Developer's Manual", vol. 3A, System Programming Guide, Part 1, May 2001, pp. 850 pages.

Sanchez, et al., "Thermal Management System for High Performance Power PC(TM) Microprocessors", IEEE, Motorola Inc., Apple Computer Corporation, 1997, pp. 325-330.

Office Action Received for Chinese Patent Application No. 200910246876.3, mailed on Nov. 15, 2011, 6 pages of Office Action and 16 pages of English Translation.

Office Action Received or U.S. Appl. No. 12/165,231, mailed on Nov. 2, 2011, 11 pages.

Office Action Received for Chinese Patent Application No. 200910249077.1, mailed on Jan. 29. 2012, 5 pages of Office Action and 5 pages of English Translation.

Office Action Received for U.S. Appl. No. 12/263,421, mailed on Apr. 20, 2012, 13 pages.

Office Action Received for the Chinese Patent Application No. 200910249077.1, mailed on Jul. 16, 2012, 8 pages of Office Action and 9 pages of English Translation.

Office Action Received for German Patent Application No. 1020090513876, mailed on Aug. 20, 2012, 6 pages of Office Action and 5 pages of English Translation.

Notice of Allowance Received for U.S. Appl. No. 12/263,421, mailed on Nov. 21, 2012, 5 pages.

Office Action Received for Chinese Patent Application No. 200910246876.3, mailed on Oct. 29, 2012, 7 pages of Office Action and 13 pages of English Translation.

Office Action received for U.S. Appl. No. 13/847,392, mailed on Aug. 20, 2013, 4 pages.

Office Action received for the Chinese Patent Application No. 200910246876.3, mailed on Jun. 5, 2013, 31 pages of including 20 pages of English translation.

Office Action received for Taiwanese Patent Application No. 98136920, mailed on Jun. 3, 2013, 7 pages of including 2 pages of Foreign Associates reporting correspondence.

Office Action for the Chinese Patent Application No. 200910246876.3, mailed on Nov. 4, 2013, 10 pages including 19 pages of English Translation.

Office Action for Taiwan Patent Application No. 098136968, mailed on Dec. 2, 2013, 10 pages of English Translation and 7 pages of Taiwan Office Action including Search Report.

* cited by examiner

DETERMINISTIC MANAGEMENT OF DYNAMIC THERMAL RESPONSE OF PROCESSORS

FIELD

The present disclosure generally relates to the field of electronics. More particularly, an embodiment of the invention relates to deterministic management of dynamic thermal response of processors.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. For example, a portable computing device may solely rely on battery power. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

To improve performance, some processors may use a "turbo" mode. For example, turbo mode may allow a processor to increase the supply voltage and frequency up to a pre-defined Thermal Design Power (TDP) limit, for example due to workload demands. However, the TDP limit may be set based on steady state conditions, which result in latency even when the TDP limit may be exceeded without causing thermal emergencies. Other turbo techniques may make use of dynamic characteristics of cooling system. These dynamic characteristics of TDP limit may be significantly variable from one processor to the next processor. This may be unacceptable to equipment manufacturers or end users.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide efficient and deterministic power management for processors. In an embodiment, dynamic thermal response of a processor may be deterministically managed. For example, as discussed above, in some implementations, the TDP limit may be defined based on steady state and may be calculated over a rolling average over time, e.g., of about 5 seconds. This definition may be well-suited to describe steady state conditions but can be too conservative as far as cooling systems are concerned. Furthermore, heat sinks (which may be coupled to a processor to provide cooling alone or in conjunction with one or more fans) generally provide relatively high heat capacity that allows higher power for a reasonably long period, e.g., longer than the short bursts of time used by a turbo feature. Moreover, in real user workloads, there may be a significant dynamic headroom from heat sinks, e.g., due to the thermal mass and heat capacity. Accordingly, in accordance with some embodiments, more responsive behavior may be extracted from a processor by allowing it to run at a high power (e.g., high voltage and/or frequency levels) for reasonable intervals until the heat sink thermal mass heats up. Hence, to an end user, the system may provide high performance for short bursts of work, which may characterize typical interactive work. Moreover, some embodiments may be applied in computing systems that include one or more processors (e.g., with one or more processor cores), such as those discussed with reference to FIGS. 1-5.

Figure 1:
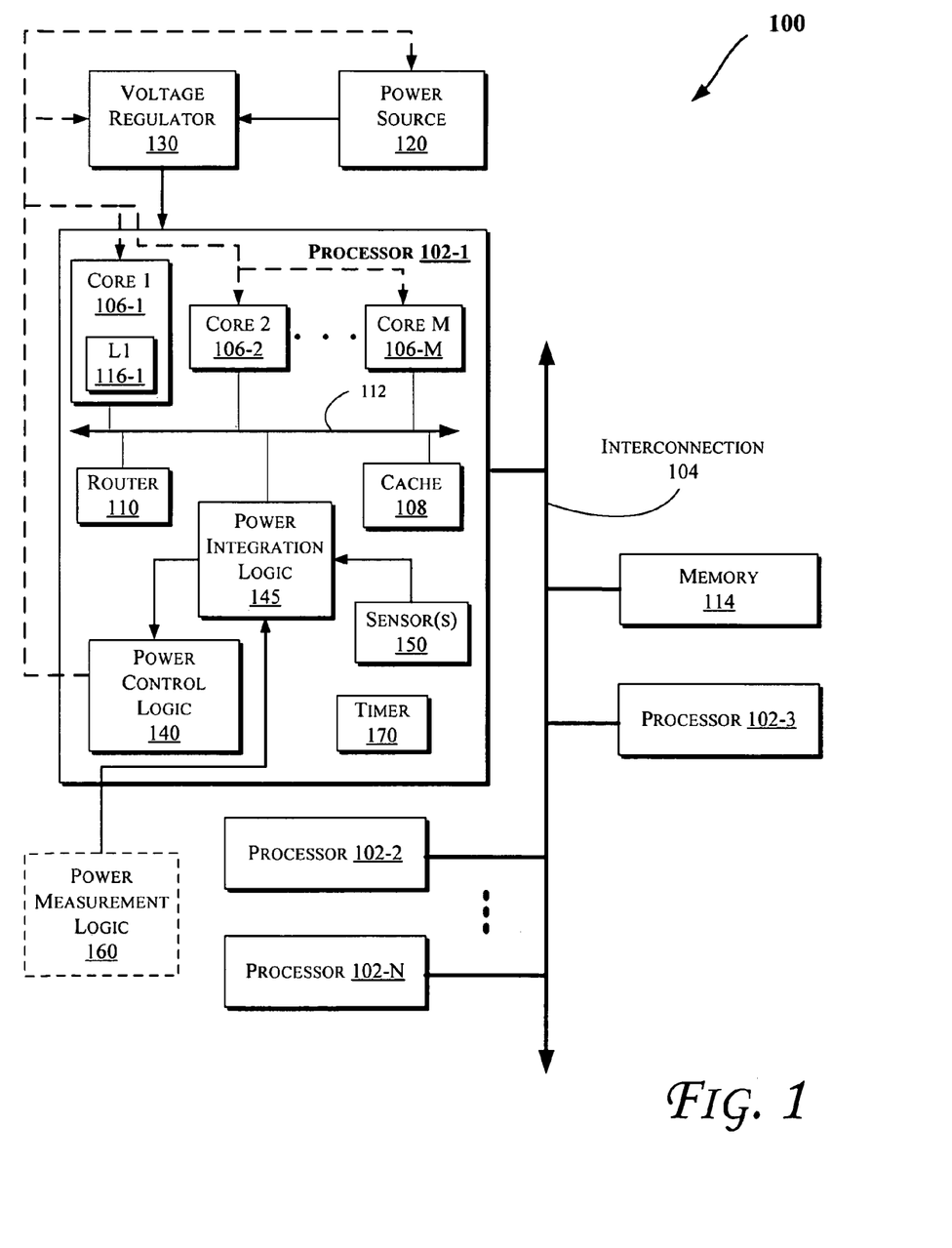
FIGS. 1, 4, and 5 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 4-5), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

Figure 4:
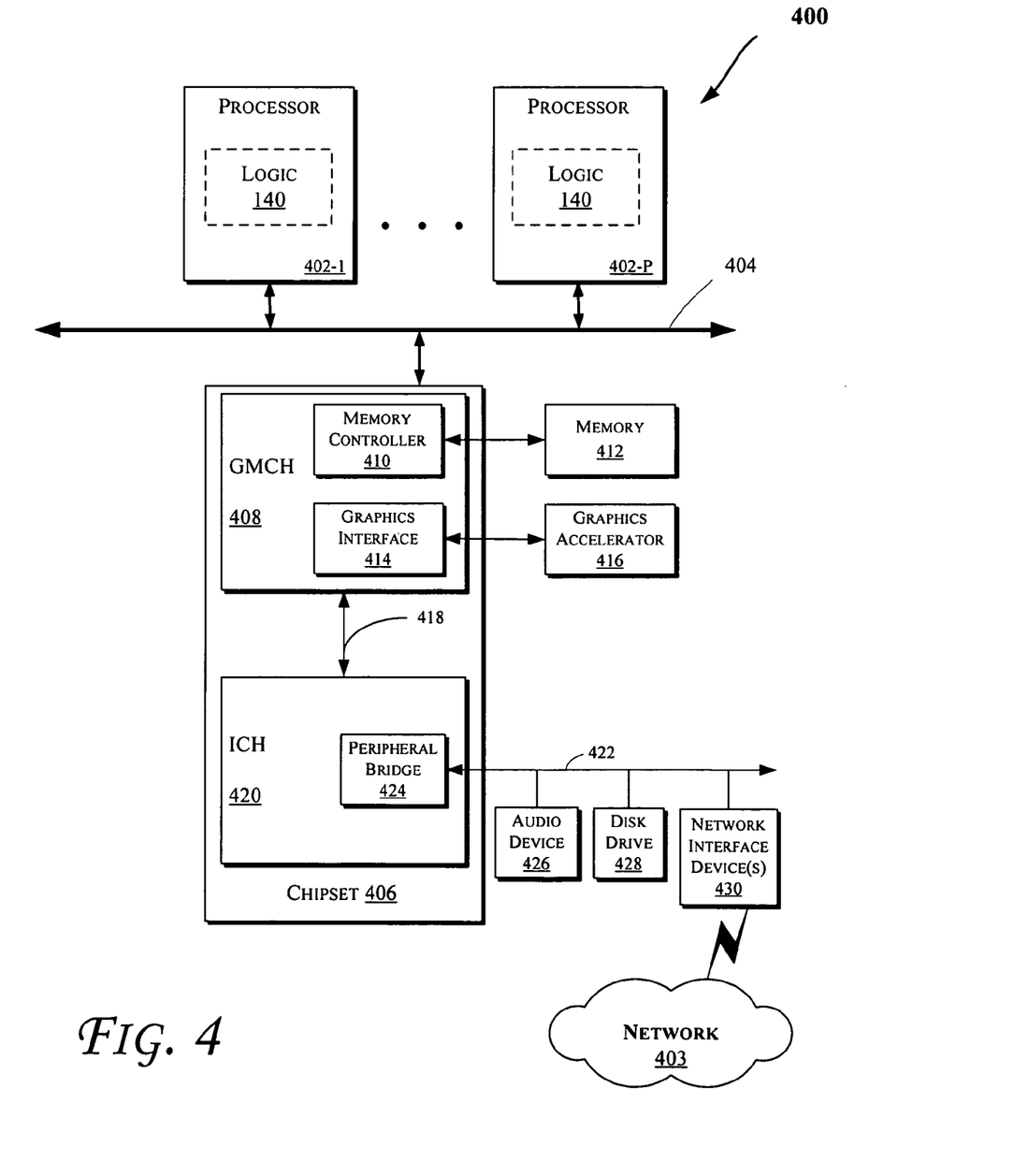
Figure 5:
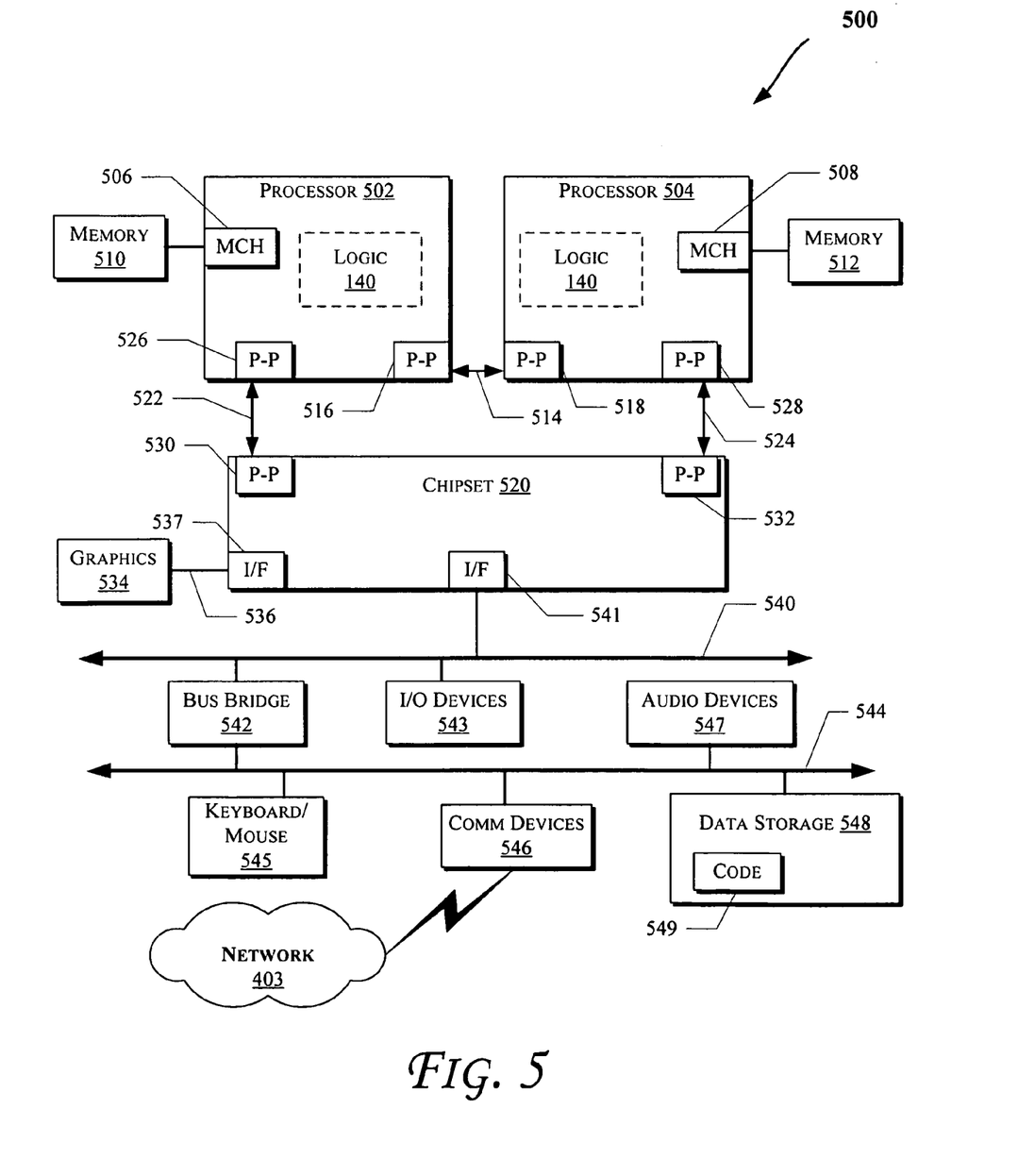

As shown in FIG. 1, the processor 102 may further include a power control logic 140 to control supply of power to components of the processor 102 (e.g., cores 106). Logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120. For example, the logic 140 may be coupled to receive information (e.g., in the form of one or more bits or signals) to indicate status of one or more sensors 150 (where the sensor(s) 150 may be provided proximate to components of system 100 (or other computing systems discussed herein such as those discussed with reference to other figures including 4 and 5, for example), such as the cores 106, interconnections 104 or 112, etc., to sense variations in various factors affecting power/thermal behavior of the system, such as temperature, operating frequency, operating voltage, power consumption, inter-core communication activity, etc.) and/or information from a power integration logic 145 (e.g., which may indicate the operational status of various components of system 100 such as architectural events and power estimation(s) corresponding to cores 106, which may be provided to logic 145 by the cores 106 directly, or via interconnection 112). In an embodiment, variations may be sensed in such a way to account for leakage versus active power. The logic 140 may instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, power consumption, etc. Even though components 140, 145, and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc.

As shown in FIG. 1, the system 100 may include a power measurement logic 160, which may be provided inside the processor or external to the processor 102 such as shown. In an embodiment, the logic 160 may measure actual power consumption levels (e.g., based on current measurements) by one or more of cores 106 (or more generally the processor 102). In some embodiments, the measurement by the power measurement logic 160 may be performed by executing software or firmware. In another embodiment, the power measurement logic 160 may track architectural activity or state of the processor (e.g., to predict values in addition to or instead of actual measurements). In an embodiment, logic 160 may be coupled to the VR 120 and/or power source 120 to measure actual current or power consumption by the processor 102.

In an embodiment, the logic 140 and/or logic within the cores 106 may determine a power level budget (e.g., for one or more of the cores 106, or the processor 102 more generally) based on TDP values and actual power levels during thermally significant time intervals. As discussed herein, "thermally significant time intervals" generally refers to the heat sink thermal respond time interval, which can be in the order of many seconds in some embodiments. For example, logic 140 and/or logic within the cores 106 (not shown) may perform a power calculation function (implemented as a firmware in an embodiment) which tracks power levels during thermally significant intervals (e.g., samples at the rate of $10^{th}$ of mS in one embodiment), e.g., where the intervals may be determined by the timer 170. For example, timer 170 may generate a signal that indicates when to sample power levels.

In an embodiment, the power control logic 140 and/or logic within the cores 106 may define a power budget as Budget (with a constraint of Budget >=0):

$$\text{Budget} = \int_0^\tau \alpha^{t-x}(TDP(x) - P(x))\,dx \geq 0 \qquad (1)$$

where Budget refers to power level which may be reached during a turbo opportunity period for one or more of the processor cores 106 (or the processor 102 more generally) that exceed the pre-defined TDP, α refers to a constant indicative of time respond behavior, x refers sampling points during thermally significant time interval t (e.g., $10^{th}$ of mS in one embodiment), t refers to a thermally significant time measured in seconds, P(x) refers to actual power consumption level at sampling point x (e.g., as determined by logic 160), and TDP(x) refers to the TDP defined for sampling point x (e.g., which may be stored in a storage device of processor 102).

More particularly, the outcome of the above calculation may correspond to a prediction of the processor junction temperature (Tj) under thermal model represented by this equation including heat sink mass and thermal conductivity and the standard ambient temperature defined in the part specifications in some embodiments. Since the calculation may be performed under standard ambient conditions, e.g., according to the worse case part specifications, it predicts the worst case temperature across the entire population. The power control logic 140 may invoke power management actions such as dynamic voltage and/or frequency scaling (e.g., by instructing VR 130, power source 120, and/or cores 106) based on the calculation to fit the processor 102 into the requisite thermal specifications.

Figure 2:
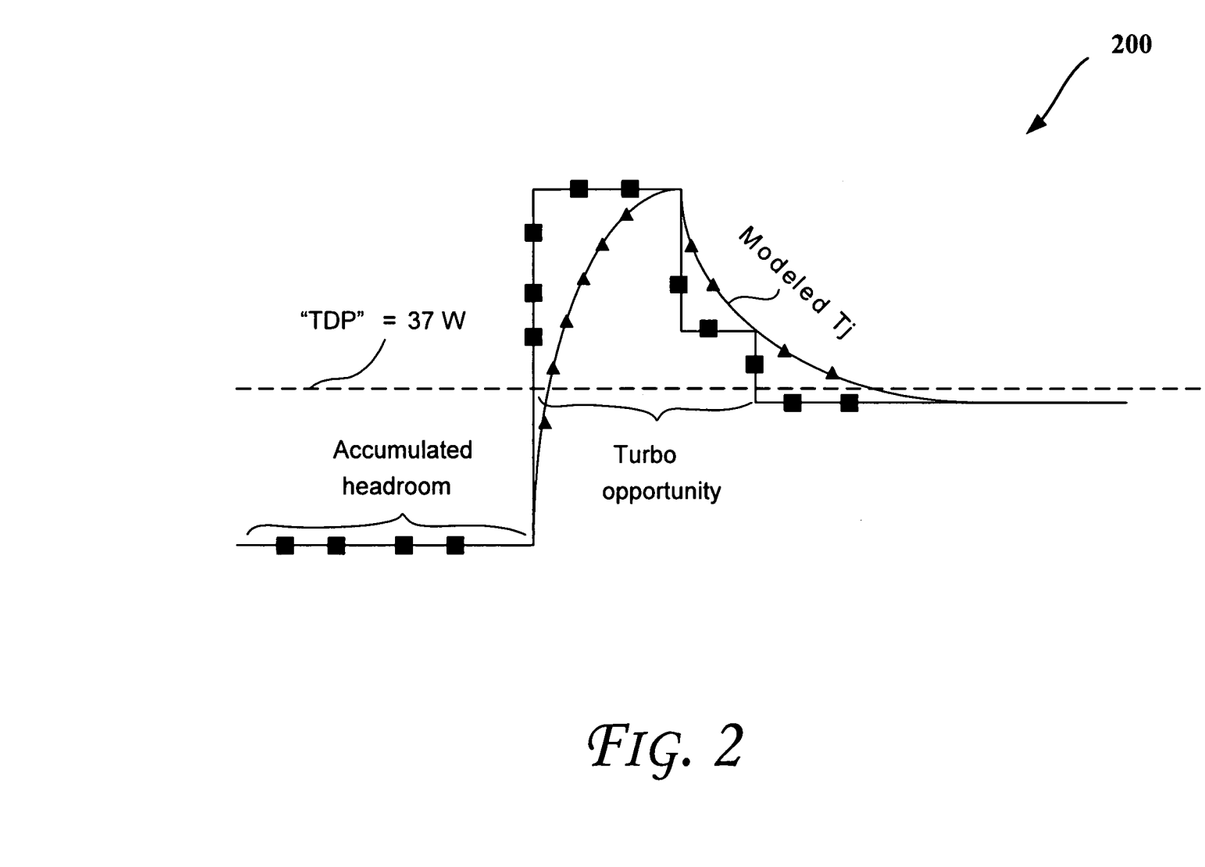
FIG. 2 illustrates a graph according to an embodiment of invention.

An example of the predicted temperature Tj (the line with triangle markings) in accordance with the above formula (1) and the power state generated as a result of the calculation (the line with the square markings) is illustrated in FIG. 2, in accordance with one embodiment. It may be noted that after some time at idle power (e.g., shown as accumulated headroom below TDP of 37 W), the processor may run at high power for a period of time (e.g., shown as turbo opportunity in FIG. 2) before needing to reduce power back to steady state level (e.g., 37 W in the illustrated example). The calculated Tj may not fully utilize potential thermal headroom. It however provides the deterministic behavior, e.g., that each and every part will turbo similarly regardless of variable parameters such as ambient temperature, thermo-mechanical variances and/or part to part variance.

Accordingly, in an embodiment, available thermal headroom may be used to extract the performance potential in a deterministic way such that it reduces or even eliminates the product-to-product variations. For example, in an embodiment, a thin and light notebook may run 4 bins higher for a period of about 90 seconds by applying the techniques discussed herein. Accordingly, some embodiments may significantly improve user perceived performance while mitigating equipment manufacturer concerns about consistent behavior of a product. Also, human use of computers may be characterized by short bursts of compute cycles with pause intervals in between for data entry, reading, thinking, etc. During the compute burst periods, a 37% higher performance than non-dynamic behavior may be achieved in an embodiment. This in turn reduces or eliminates one of the key gating items to dynamic performance which may be non-deterministic behavior. Also, it is understood that other calculations may be performed to achieve similar functionality. Alternatively the above equation may be replaced with a EWMA (Exponentially Weighted Moving Average) Low Pass Filter. It is also possible to use time intervals in power states.

Figure 3:
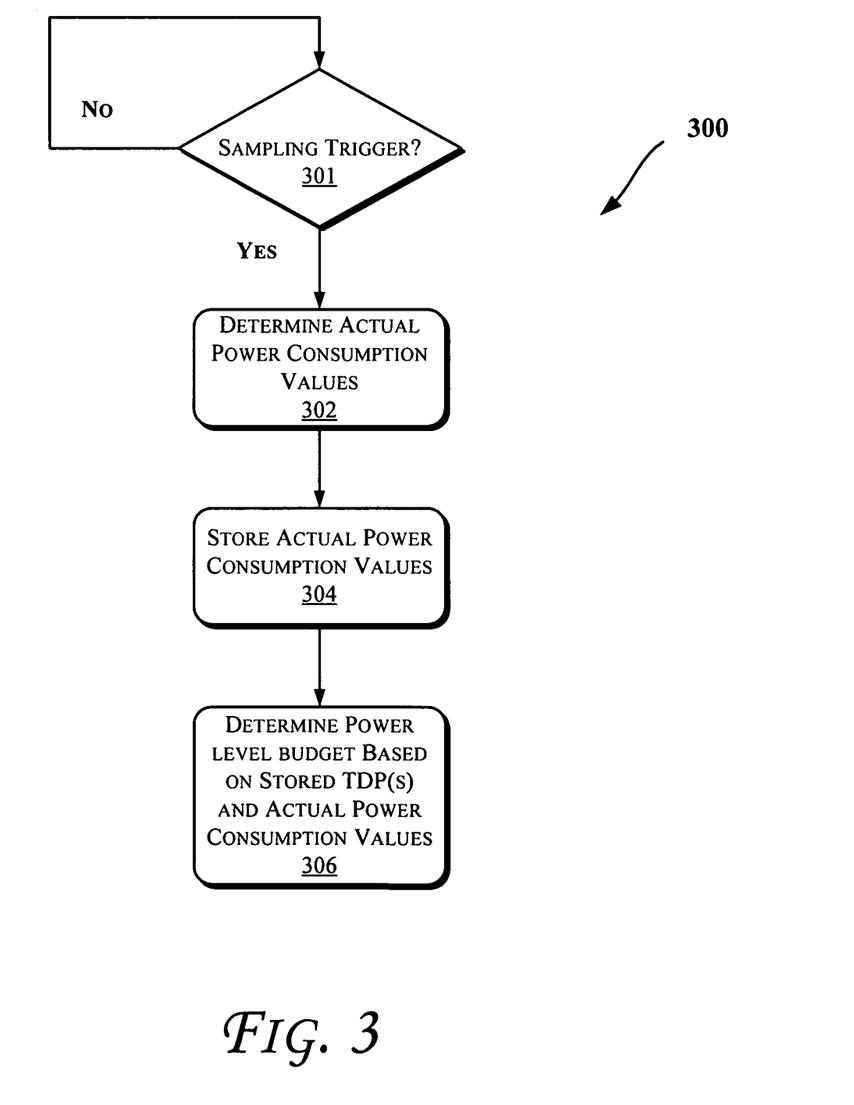
FIG. 3 illustrates a flow diagram of a method according to an embodiment.

FIG. 3 illustrates a flow diagram of an embodiment of a method 300 to deterministically manage dynamic thermal response of processors. In an embodiment, various components discussed with reference to FIGS. 1-2 and 4-5 may be utilized to perform one or more of the operations discussed with reference to FIG. 3.

Referring to FIGS. 1-3, at an operation 301, it may be determined whether a sampling trigger (e.g., as generated by the timer 170) has occurred. If so, at an operation 302, actual power consumption values by a processor (e.g., processor 102 or one or more of its cores 106) during a first time period (e.g., during a headroom period such as shown in FIG. 2 and discussed above with reference to formula (1)) may be determined. At an operation 304, the values of operation 302 may be stored in a memory (such as those discussed with reference to FIGS. 1 and 4-5). In an embodiment, TDP(s) corresponding to the first period may also be stored in a memory.

At an operation 306, a power level budget for the processor (or one or more of its cores) may be determined based on the actual power consumption values and the one or more TDP values (such as discussed above with reference to formula (1) and FIGS. 1-2, for example). In an embodiment, the power level budget may indicate whether the processor (or one or more of its cores) may exceed the one or more TDP values during a second period (which may follow the first period, such as the turbo opportunity discussed with reference to FIG. 2 which follows the accumulated headroom period). In an embodiment, one or more TDP values may be loaded during run time (e.g., at any time).

FIG. 4 illustrates a block diagram of a computing system 400 in accordance with an embodiment of the invention. The computing system 400 may include one or more central processing unit(s) (CPUs) or processors 402-1 through 402-P (which may be referred to herein as "processors 402" or "processor 402"). The processors 402 may communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. In some embodiments, one or more of the processors 402 may include one or more of the cores 106, logic 140, logic 145, logic 160, timer 170, sensor(s) 150, of FIG. 1. Also, the operations discussed with reference to FIGS. 1-3 may be performed by one or more components of the system 400. For example, a voltage regulator (such as VR 130 of FIG. 1) may regulate voltage supplied to one or more components of FIG. 4 at the direction of logic 140.

A chipset 406 may also communicate with the interconnection network 404. The chipset 406 may include a graphics and memory control hub (GMCH) 408. The GMCH 408 may include a memory controller 410 that communicates with a memory 412. The memory 412 may store data, including sequences of instructions that are executed by the processor 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a graphics accelerator 416. In one embodiment of the invention, the graphics interface 414 may communicate with the graphics accelerator 416 via an accelerated graphics port (AGP). In an embodiment of the invention, a display (such as a flat panel display, a cathode ray tube (CRT), a projection screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the processor 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and one or more network interface device(s) 430 (which is in communication with the computer network 403). Other devices may communicate via the bus 422. Also, various components (such as the network interface device 430) may communicate with the GMCH 408 in some embodiments of the invention. In addition, the processor 402 and the GMCH 408 may be combined to form a single chip. Furthermore, the graphics accelerator 416 may be included within the GMCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500. For example, a voltage regulator (such as VR 130 of FIG. 1) may regulate voltage supplied to one or more components of FIG. 5.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. Also, the processors 502 and 504 may include one or more of the cores 106, logic 140/145/16, timer 170, and/or sensor(s) 150 of FIG. 1.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, one or more operations discussed with reference to FIGS. 1-4 may be performed by the processors 502 or 504 and/or other components of the system 500 such as those communicating via a bus 540. Other embodiments of the invention, however, may exist in other circuits, logic units, or devices within the system 500 of FIG. 5. Furthermore, some embodiments of the invention may be distributed throughout several circuits, logic units, or devices illustrated in FIG. 5.

Chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-5.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. A processor comprising:
first logic to determine power consumption values by the processor during a first time period, wherein the power consumption values and one or more thermal design power (TDP) values corresponding to the first time period are to be stored in memory; and second logic to determine a power level budget for the processor based on the power consumption values, one or more variations in inter-processor core communication activity, and the one or more TDP values, wherein the power level budget is to indicate whether the processor may exceed the one or more TDP values, wherein the first logic is to determine the power consumption values at least for a thermally significantly time interval, wherein a timer is to generate a signal indicative of a sampling rate, wherein the first logic is to determine the power consumption values at the sampling rate.

2. The processor of claim 1, where the one or more TDP values are to be loaded during run time.

3. The processor of claim 1, wherein the power level budget is to indicate whether the processor may exceed the one or more TDP values during a second time period.

4. The processor of claim 3, wherein the second time period is to follow the first time period.

5. The processor of claim 1, further comprising a plurality of cores, wherein at least one of the cores comprises the second logic.

6. The processor of claim 5, wherein the second logic is to determine a power level budget for more than one of the plurality of cores.

7. The processor of claim 5, wherein the second logic is to determine a power level budget for a sum of power consumption by the plurality of cores.

8. The processor of claim 5, further comprising third logic to cause a change to a voltage level supplied to at least one of the plurality of cores and/or an operating frequency of at least one of the plurality of cores based on the power level budget.

9. The processor of claim 1, further comprising one or more sensors to detect variations, corresponding to components of the processor, in one or more of: operating frequency or operating voltage of one or more components of the processor, temperature, and power consumption.

10. The processor of claim 1, further comprising third logic to cause a change to a voltage level supplied to the processor and/or an operating frequency of the processor based on the power level budget.

11. The processor of claim 1, wherein a voltage regulator is to supply power to the processor.

12. The processor of claim 1, wherein the second logic, the first logic, and the memory are on a single integrated circuit.

13. The processor of claim 1, wherein the first logic is to track architectural activity to predict values in addition to or instead of actual measurements.

14. The processor of claim 1, wherein the first logic is to track a state of the processor to predict values in addition to or instead of actual measurements.

15. The processor of claim 1, wherein the one or more variations in inter-processor core communication activity are to be detected by one or more sensors.

16. The processor of claim 1, wherein the thermally significant time interval is to be determined based on a heat sink thermal response time interval.

17. A method comprising:
determining power consumption values by a processor during a first time period, wherein the power consumption values and one or more thermal design power (TDP) values corresponding to the first time period are stored; and
determining a power level budget for the processor based on the power consumption values, one or more variations in inter-processor core communication activity, and the one or more TDP values, wherein the power level budget indicates whether the processor may exceed the one or more TDP values, wherein the processor determines the power consumption values at least for a thermally significantly time interval, wherein a timer generates a signal indicative of a sampling rate, wherein the processor determines the power consumption values at the sampling rate.

18. The method of claim 17, further comprising causing a change to a voltage level supplied to the processor and/or an operating frequency of the processor based on the power level budget, wherein the power level budget is to indicate whether the processor may exceed the one or more TDP values during a second time period.

19. The method of claim 17, further comprising detecting variations, corresponding to components of the processor, in one or more of: operating frequency or operating voltage of one or more components of the processor, temperature, and power consumption.

20. The method of claim 17, further comprising determining a power level budget for more than one core of the processor.

21. The method of claim 17, further comprising generating a signal indicative of a sampling rate, wherein determining the power consumption values is performed at the sampling rate.

22. A non-transitory computer-readable medium comprising one or more instructions that when executed on a processor configure the processor to perform one or more operations to:
determine power consumption values by a processor during a first time period;
store the power consumption values and one or more thermal design power (TDP) values corresponding to the first time period; and
determine a power level budget for the processor based on the power consumption values, one or more variations in inter-processor core communication activity, and the one or more TDP values, wherein the power level budget indicates whether the processor may exceed the one or more TDP values, wherein the processor determines the power consumption values at least for a thermally significantly time interval, wherein a timer generates a signal indicative of a sampling rate, wherein the processor determines the power consumption values at the sampling rate.

23. The computer-readable medium of claim 22, further comprising one or more instructions that when executed on a processor configure the processor to perform one or more operations to cause a change to a voltage level supplied to the processor and/or an operating frequency of the processor based on the power level budget, wherein the power level budget is to indicate whether the processor may exceed the one or more TDP values during a second time period.

24. The computer-readable medium of claim 22, further comprising one or more instructions that when executed on a processor configure the processor to perform one or more operations to detect variations, corresponding to components of the processor, in one or more of: operating frequency or operating voltage of one or more components of the processor, temperature, and power consumption.

25. The computer-readable medium of claim 22, further comprising one or more instructions that when executed on a processor configure the processor to perform one or more operations to determine a power level budget for more than one core of the processor.

26. The computer-readable medium of claim 22, further comprising one or more instructions that when executed on a processor configure the processor to perform one or more operations to generate a signal indicative of a sampling rate, wherein determining the power consumption values is performed at the sampling rate.

27. A system comprising:
  a processor having a plurality of processor cores, wherein power consumption values by the processor during a first time period and one or more thermal design power (TDP) values corresponding to the first time period are to be stored and wherein the processor is to comprise:
    first logic to determine the power consumption values; and
    second logic to determine a power level budget for one or more of the plurality of processor cores based on the power consumption values, one or more variations in inter-processor core communication activity, and the one or more TDP values, wherein the power level budget is to indicate whether the one or more processor cores may exceed the one or more TDP values during a second time period following the first time period, wherein the first logic is to determine the power consumption values at least for a thermally significantly time interval, wherein a timer is to generate a signal indicative of a sampling rate, wherein the first logic is to determine the power consumption values at the sampling rate; and
  a voltage regulator to supply power to the plurality of processor cores.

28. The system of claim 27, further comprising third logic to cause a change to a voltage level supplied to at least one of the plurality of cores and/or an operating frequency of at least one of the plurality of cores based on the power level budget.

29. The system of claim 27, further comprising a power source coupled to the processor via the voltage regulator.

30. The system of claim 27, further comprising third logic coupled between the second logic and the first logic.

31. The system of claim 27, further comprising one or more sensors to detect variations, corresponding to one or more of the plurality of processor cores, in one or more of: operating frequency, operating voltage, temperature, and power consumption.

32. The system of claim 27, further comprising an audio device.

* * * * *